Sept. 21, 1926.
J. BASINI
DIPPING FORK
Filed March 23, 1923
1,600,649
Fig.1.
Fig.2.
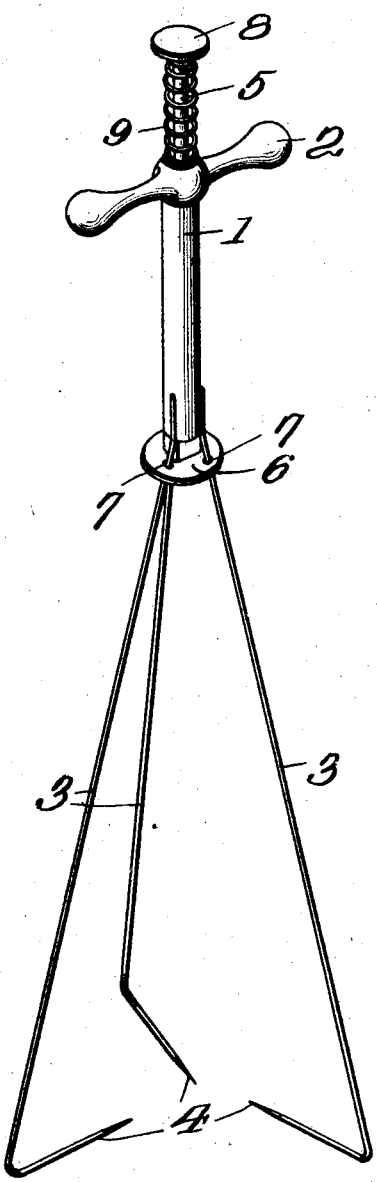
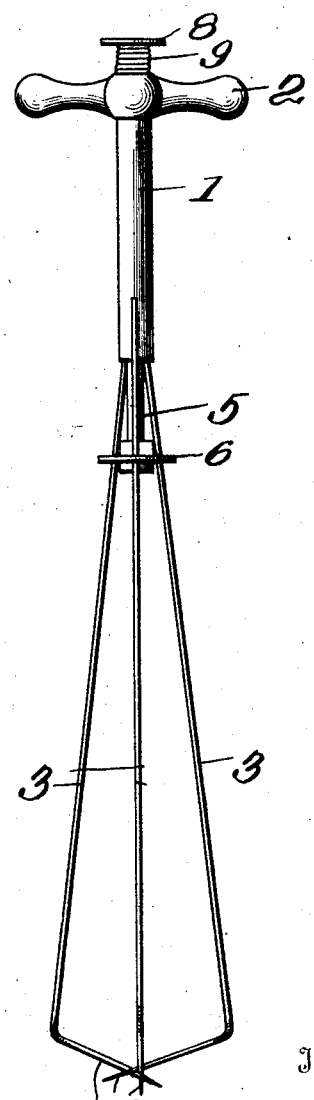
Inventor
JOHN BASINI.
By
Attorney Patented Sept. 21, 1926.

1,600,649

UNITED STATES PATENT OFFICE.

JOHN BASINI, OF MISSOULA, MONTANA.

DIPPING FORK.

Application filed March 23, 1923. Serial No. 627,116.

My invention relates to dipping forks, and particularly to such as are used for holding candy, cakes, ice cream, or other confections while dipping for coating. The object of the invention is to provide a simple and improved mechanism of this character which may be cheaply manufactured and one wherein the few parts necessary to its operation are so arranged as to not readily get out of order.

In the drawings, Figure 1 is a view in perspective of my improved dipping fork, and Figure 2 is an elevation showing the fingers of the fork contracted.

As shown, 1 designates a sleeve to the upper end of which a finger-hold 2 is secured. This finger-hold which may be of any preferred type is illustrated as a transverse bar. Spaced equidistant around the lower end of the sleeve and fixedly secured thereto are fingers 3 each of which is formed of spring wire and has its lower extremity bent at approximately right angles to its length to form a tine 4. In their normal position these fingers are flared outwardly to permit them to be placed over the article to be gripped. A rod 5 extends through and is reciprocal within the sleeve 1. This rod has a plate 6 at its lower end which plate is provided with apertures 7 through which the fingers 3 project, these apertures being approximately in the same line as that portion of the fingers where they are attached to the sleeve 1. The other end of the rod 5 which extends outwardly through the handle end of the sleeve has a head 8 which serves to retain a coiled spring 9 in position on the rod between the end of the sleeve and the head of the rod, and the latter also serves as a thumb-piece for moving the rod relatively to the sleeve against the tension of the spring. Pressure on the rod which tends to force it against the pressure of its spring moves the plate 6 outwardly over the fingers with the result that the fingers are drawn together which causes the tines to grip the article to be supported for dipping, as shown in Figure 2. Releasing of this pressure on the thumb-piece will allow the tines to spread apart under their own spring pressure and effect a release of the supported article.

Particular attention is directed to the fact that the disk-shaped head 8 at the rear end of the rod 5 not only provides an abutment for the rear end of the spring 9, but also a convenient means for engaging the palm of one of the hands of the operator so that the fingers may extend forwardly and engage the laterally projecting oppositely located finger grips 2 preparatory to advancing the rod 5 against the tension of the coiled spring.

The advantages of my invention will be apparent. It is to be noted that such confections as candy, ice cream and the like, may be quickly gripped by the fork and dipped into any preferred coating composition and then immediately placed in the hands of the user, the vendor not having to personally touch any portion of the article.

I claim as my invention:

A confection handling device comprising a sleeve having the rear end thereof formed with oppositely located laterally directed finger grips, a rod slidable through said sleeve and having the rear end thereof formed with a head adapted for engagement by the palm of one's hand and constituting an abutment for a spring, a spring mounted on said rod between said head and the rear end of said sleeve, the forward portion of said rod being extended beyond the forward end of said sleeve and formed with a disk shaped enlargement having openings, outwardly diverging spring arms extending through said openings and secured at their rear ends to said sleeve, the aforementioned disk openings being in axial alignment with the rear ends of said arms so as to permit of the normal maximum divergence of the extended portions of said arms when the disk is in its normal position adjacent the end of said sleeve, the forward portions of said arms being provided with inwardly directed confection engaging tines.

In testimony whereof I have signed this specification.

JOHN BASINI.